US008140867B2

(12) United States Patent
Little et al.

(10) Patent No.: US 8,140,867 B2
(45) Date of Patent: *Mar. 20, 2012

(54) SPECIFYING A SET OF FORBIDDEN PASSWORDS

(75) Inventors: Herbert Anthony Little, Waterloo (CA); Michael Stephen Brown, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,314

(22) Filed: Jan. 31, 2011

(65) Prior Publication Data

US 2011/0126262 A1 May 26, 2011

Related U.S. Application Data

(63) Continuation of application No. 11/342,540, filed on Jan. 31, 2006, now Pat. No. 7,904,729.

(60) Provisional application No. 60/726,170, filed on Oct. 14, 2005.

(51) Int. Cl.
*G06F 21/00* (2006.01)

(52) U.S. Cl. ........ 713/193; 713/183; 713/184; 713/185; 713/186; 709/225; 709/229; 726/2; 726/5; 726/9; 726/19; 726/20

(58) Field of Classification Search .......... 713/183–186; 726/2–6, 9, 19–20; 709/225, 229
See application file for complete search history.

(56) References Cited

U.S. PATENT DOCUMENTS

| 5,394,471 | A | 2/1995 | Ganesan et al. |
| 6,748,544 | B1* | 6/2004 | Challener et al. ............... 726/17 |
| 2004/0073815 | A1* | 4/2004 | Sanai et al. ................... 713/202 |
| 2005/0235341 | A1 | 10/2005 | Stieglitz et al. |
| 2006/0047704 | A1* | 3/2006 | Gopalakrishnan ......... 707/104.1 |
| 2007/0101151 | A1 | 5/2007 | Little et al. |

FOREIGN PATENT DOCUMENTS

WO 0011534 3/2000

OTHER PUBLICATIONS

Carlo Blundo, "Hippocrates: a new proactive password checker", The Journal of Systems and Software 71 (2004) 163-175.*
European Search Report dated Jan. 21, 2010, European Patent Application No. 06705086.4.
Hietaniemi, "Ipasswd—Proactive Password Security", Proceedings of the Systems Administration Conference, vol. 6, Jan. 1, 1992, pp. 105-114.
Yan, Jianxin Jeff, A Note on Proactive Password Checking, Computer Laboratory, University of Cambridge.

(Continued)

*Primary Examiner* — Taghi Arani
*Assistant Examiner* — Josnel Jeudy
(74) *Attorney, Agent, or Firm* — Bereskin & Parr LLP/S.E.N.C.R.L., s.r.l.

(57) ABSTRACT

Various embodiments are described for providing password approval on a device. The password approval includes getting the user password, generating at least one symbolically equivalent password and then comparing the at least one symbolically equivalent password with at least one specified forbidden password. The user password is disapproved if one of the symbolically equivalent passwords corresponds to the at least one forbidden password.

20 Claims, 5 Drawing Sheets

OTHER PUBLICATIONS http://www.utimaco.us/products/easy/manual/1-134.html "Defining forbidden passwords".

http://www.utimaco.us/products/easy/manual/1-125.html "SafeGuard Easy's Internal Password Rules".

http://www.utimaco.us/products/easy/manual/1-135.html "Importing a password list".

Klein, D. "Foiling the Cracker: A Survey of, and Improvements to, Password Security"; 2nd USENIX Security Workshop, p. 5-14, 1990.

Morris, R. "Password Security: A Case History"; Communications of the ACM, Nov. 1979, vol. 22, No. 11, pp. 594-597.

WEBsite: www.openwall.com/passwords/wordlists printed May 25, 2006.

Curry, David A., Final Report, 1990 "Improving the Security of your Unix System", ITSTD-721-FR-90-21.

WEBsite: http://security.uchicago.edu/docs/userpassword.shtml; "Methods for Choosing a good, Memorable Password" printed Jun. 5, 2006.

Jeyaraman et al. "Have the cake and eat it too—Infusing usability into text-based authentication systems"; Proceedings of the 21st Annual Computer Security Applications Conference 2005.

"A Remote User Authentication Scheme Using Strong Graphical Passwords"; Proceedings of the IEEE Conference on Local Computer Networks 30th Anniversary 2005.

International Search Report for PCT/CA2006/000118 dated Aug. 3, 2006.

Written Opinion for corresponding international application PCT/CA2006/000118, date of mailing Aug. 3, 2006.

International Preliminary Report on Patentability from related International Application No. PCT/CA2006/000118, dated Apr. 24, 2008.

Canadian Office Action dated Oct. 31, 2011, Canadian Patent Application No. 2,623,990.

* cited by examiner

SPECIFYING A SET OF FORBIDDEN PASSWORDS

REFERENCE TO RELATED APPLICATION

This application is a continuation of U.S. patent application Ser. No. 11/342,540, filed on Jan. 31, 2006 and issued as U.S. Pat. No. 7,904,729, which claims the benefit of U.S. Provisional Application No. 60/726,170, filed on Oct. 14, 2005; the contents of application Ser. No. 11/342,540 and of Application No. 60/726,170 are hereby incorporated by reference.

FIELD

The embodiments described herein relate to password entry for a mobile communication device.

BACKGROUND

Passwords are commonly used to allow a user to securely access information or interact with a given device. However, users often select a common word or phrase for the password to make it easier to remember the password. Unfortunately, certain words may be more common in certain locations; for example, one of the most common passwords in Washington, D.C. is "redskins" (i.e. the local football team). IT administrators prefer that users do not select a common word or phrase as part of the password since this jeopardizes the security of the information or device associated with the password.

Although some IT administrators try to define certain passwords as forbidden passwords that are not allowed for use, some users may choose to substitute symbols for certain characters in the forbidden password so that the user password corresponds to the forbidden password. For example, the symbol "1" can be used instead of the character "I", or the symbol "5" can be used instead of the character "s". The symbol "1" and the character 'i' are visually related to one another as are the symbol "5" and the character "s". Accordingly, a user may attempt to subvert existing forbidden password checks by using similar looking or similar sounding passwords like "redskins" or "red5kins" in the case of preventing "redskins" for use as a password. This is not desirable since a non-authorized third party can easily determine variants for common passwords thereby uncovering the user password in these cases.

BRIEF DESCRIPTION OF THE DRAWINGS

For a better understanding of the embodiments described herein and to show more clearly how it may be carried into effect, reference will now be made, by way of example only, to the accompanying drawings which show at least one exemplary embodiment in which:

FIG. 3 is a block diagram of an exemplary embodiment of a node of a wireless network that the mobile communications device of FIG. 1 may communicate with;

DETAILED DESCRIPTION

Figure 1:
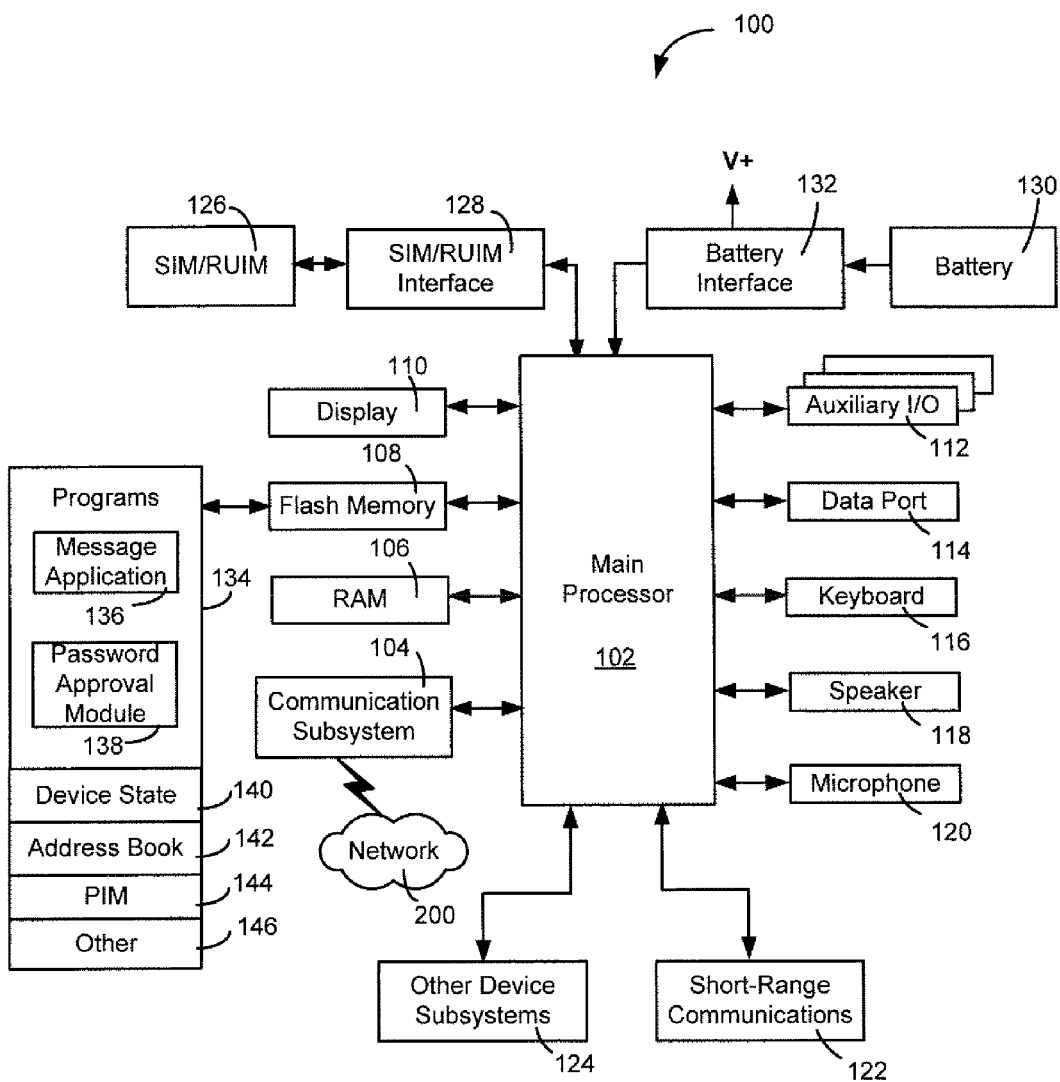
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The embodiments described herein generally relate to password verification. To facilitate an understanding of the embodiments provided herein, the embodiments will be described in terms of password approval on a mobile wireless communication device, hereafter referred to as a mobile device, that can send and receive wireless messages. Examples of applicable communication devices include pagers, cellular phones, cellular smart-phones, wireless organizers, personal digital assistants, computers, laptops, handheld wireless communication devices, wirelessly enabled notebook computers and the like, each of which requires a user to enter a password during use.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1 through 4.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The main processor 102, in addition to its operating system functions, enables execution of software applications 134 on the mobile device 100. The subset of software applications 134 that control basic device operations, including data and voice communication applications, will normally be installed on the mobile device 100 during its manufacture.

The software applications 134 include a message application 136. The message application 136 can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages may be stored remotely from the device 100 such as in a data store of an associated host system that the mobile device 100 communicates with.

Another program that is executed by the mobile device 100 provides approval for user passwords. The password approval module 138 can be used to authorize the password that has been selected by the user of the mobile device 100 based on a list of specified forbidden passwords and other information. Password approval can be undertaken periodically, or quasi-periodically, since a new list of specified forbidden passwords can be generated periodically or quasi-periodically. The list of specified forbidden passwords can include passwords that are commonly used; this may depend on the geographical area in which the user operates the mobile device since some users select their password based on local things such as sports teams, and the like. Accordingly, the list of specified passwords can be modified depending on where the mobile device 100 is being used.

The password approval module 138 executes a password approval method to determine whether the user password specified by the user of the mobile device 100 is acceptable. The user password can be a password that is currently being used, or a new password that the user wishes to use. The password approval module 138 accesses a list of specified forbidden passwords and a list of symbolic equivalents to make this determination from a local data store such as the flash memory 108. In other implementations, the password approval module 138 may be able to access this information from a remote data store. The list of specified forbidden passwords and the list of symbolic equivalents are discussed in more detail below. The list of specified forbidden passwords and the list of symbolic equivalents can be remotely updated by an administrator who maintains a server that the mobile device 100 communicates with. In some embodiments, each time the list of specified forbidden passwords or the list of symbolic equivalents is updated, the password approval module 138 can be executed to approve the current user password associated with the mobile device 100. The password approval method can be repeated several times if several different user passwords are currently being used on the mobile device 100. The operation of the password approval module 138 is discussed in further detail below. The password approval module 138 can be created using any suitable software programming language as is well known to those skilled in the art.

The mobile device 100 further includes a device state module 140, an address book 142, a Personal Information Manager (PIM) 144, and other modules 146. The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book, the information can include the name, phone number, work address and email address of the contact, among other information. The other modules 146 may include a configuration module (not shown) as well as other modules that can be used in conjunction with the SIM/RUIM interface 128.

The PIM 144 provides functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
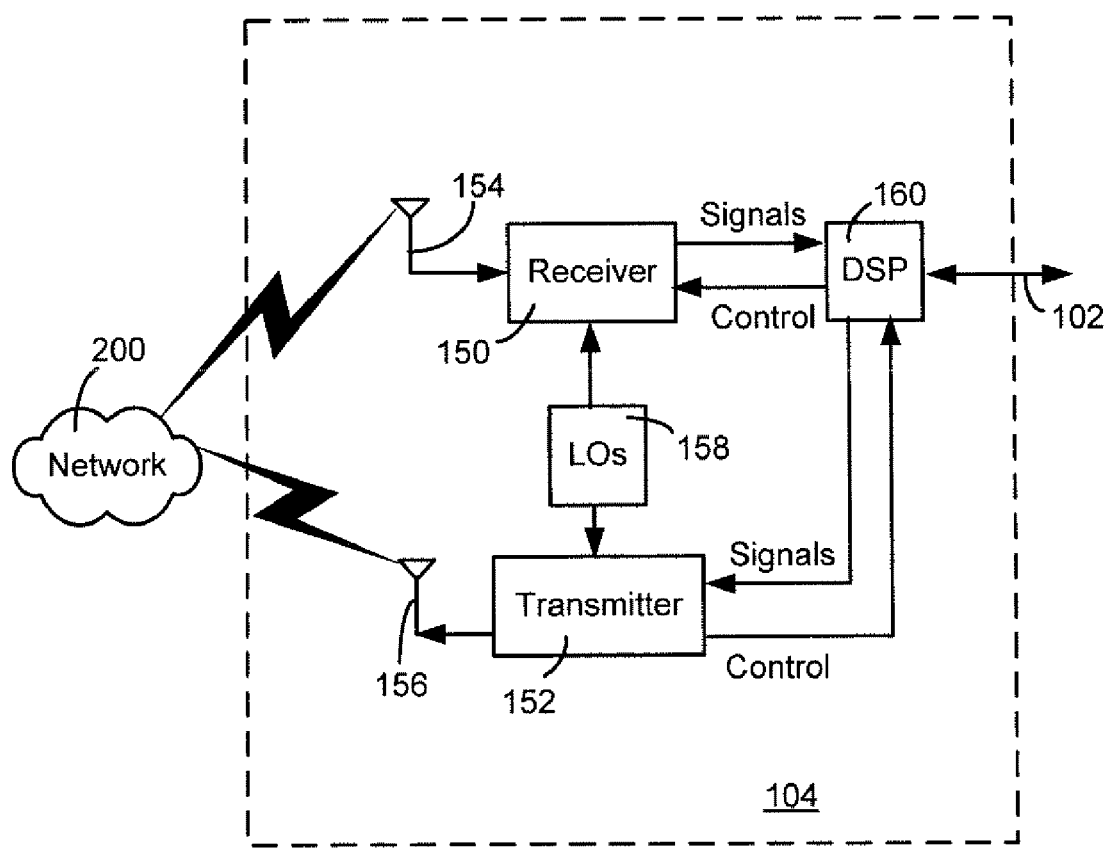
FIG. 2 is a block diagram of a communication subsystem component of the mobile communication device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150, which can perform such common receiver functions as signal amplification, frequency down conversion, filtering, channel selection, and analog-to-digital (ND) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and transmitter 152 can be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100. Accordingly, when the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
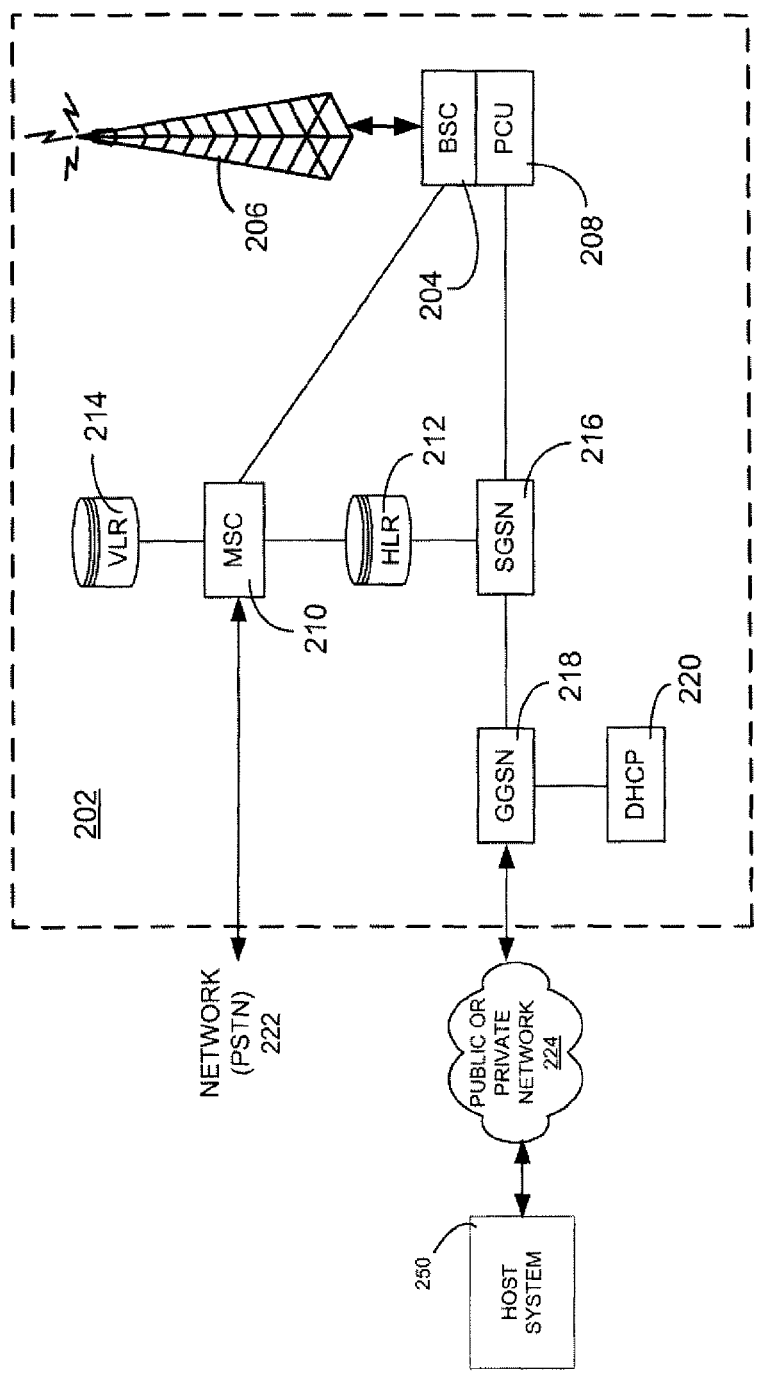

Referring now to FIG. 3, a block diagram of an exemplary implementation of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile can be stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and the DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
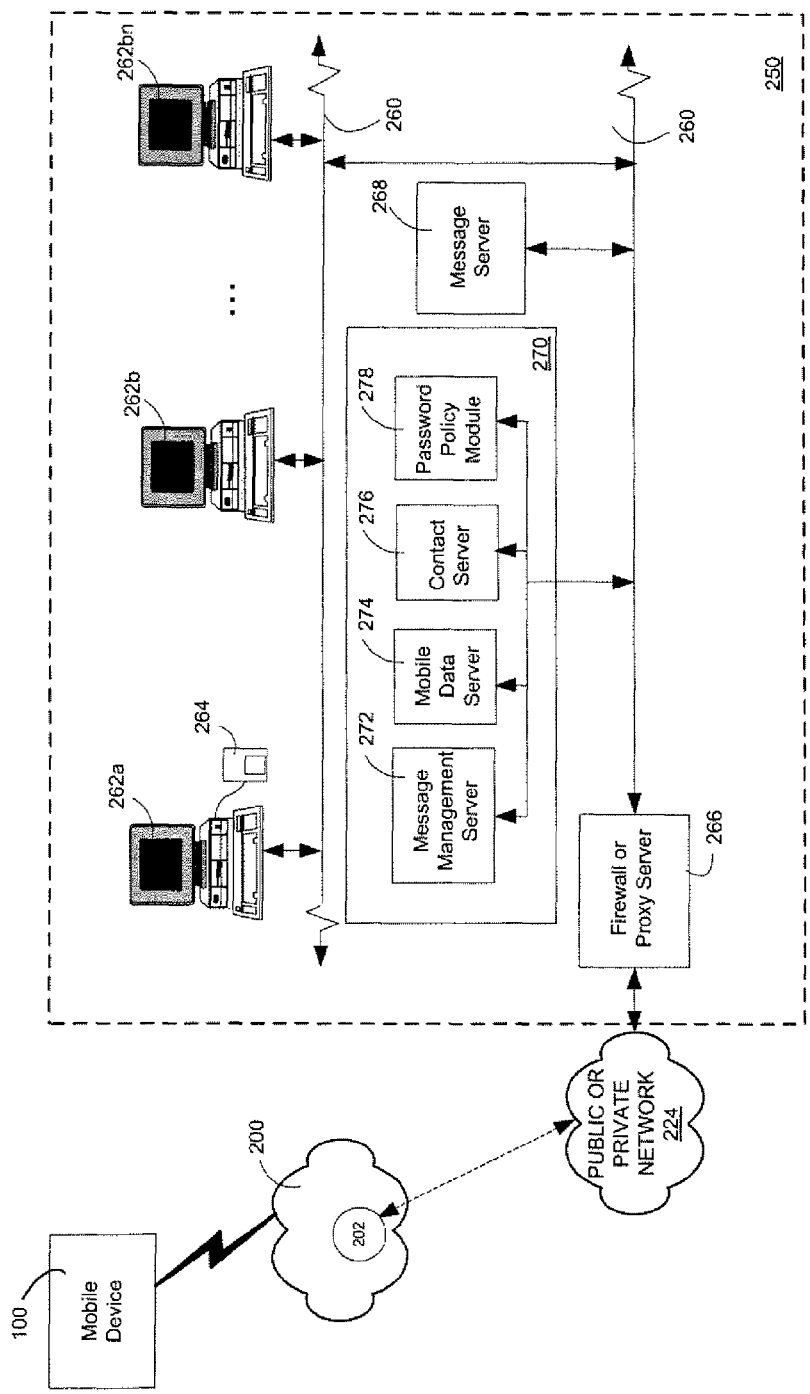
FIG. 4 is a block diagram of an exemplary embodiment of a host system that the mobile communications device of FIG. 1 may communicate with; and, FIG. 5 is a flowchart diagram of an exemplary embodiment of a password approval method.

Referring now to FIG. 4, shown therein is a block diagram illustrating components of an exemplary configuration of a host system 250. In one instance, the host system 250 can be a corporate enterprise system. The host system 250 will typically be a corporate office or other local area network (LAN), but may also be a home office computer system or some other private system, for example, in variant implementations. In the example shown in FIG. 4, the host system 250 is depicted as a LAN of an organization to which a user of the mobile device 100 belongs. Typically, a plurality of mobile devices can communicate wirelessly with the host system 250 through one or more nodes 202.

The host system 250 comprises a number of network components connected to each other by the LAN connections 260. For instance, a user's desktop computer 262*a* with an accompanying cradle 264 for the user's mobile device 100 is situated on a LAN connection. The cradle 264 for the mobile device 100 can be coupled to the computer 262*a* by a serial or a Universal Serial Bus (USB) connection, for example. Other user computers 262*b*-262*n* can also be situated on the LAN 260, and each may or may not be equipped with an accompanying cradle 264 that is suitable for a mobile device. The cradle 264 facilitates the loading of information (e.g. PIM data, private symmetric encryption keys to facilitate secure communications between the mobile device 100 and the host system 250, etc.) from the user computer 262*a* to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262*a*-262*n* will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will comprise additional components that are not explicitly shown in FIG. 4 for this exemplary configuration. More generally, the host system 250 may represent a smaller part of a larger network (not shown) of the organization, and may comprise different components and/or be arranged in different topologies than that shown in the exemplary embodiment of FIG. 4.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262*b* within the host system 250, from a different mobile device (not shown) connected to the wireless network 200 or to a different wireless network, or from a different computing device or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange™ server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In some embodiments, the data store may be a separate hardware unit (not shown) that the message server 268 communicates with. Messages can be subsequently retrieved and delivered to users by accessing the message server 268. For instance, an e-mail client application operating on a user's computer 262*a* may request the e-mail messages associated with that user's account stored on the data store associated with the message server 268. These messages are then retrieved from the data store and stored locally on the computer 262*a*. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (in the past two to three months for example) can be stored on the mobile device 100.

When operating the mobile device 100, the user may wish to have e-mail messages retrieved for delivery to the handheld. An e-mail client application operating on the mobile device 100 may also request messages associated with the user's account from the message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

To facilitate the wireless communication of messages and message-related data between the mobile device 100 and components of the host system 250, a number of wireless communication support components 270 may be provided. In some implementations, the wireless communication support components 270 can include a message management server 272, a mobile data server 274, a contact server 276, a password policy module 278, and the like.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES) or Triple DES) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in one instance, when a message is initially retrieved by the mobile device 100 from the message server 268, the message management server 272 may push only the first part of a message to the mobile device 100, with the part being of a pre-defined size (e.g. 2 KB). The user can then request more of the message, to be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion to the address book 142 on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276 and the password policy module 278 need not be implemented on separate physical servers within the host system 250. For example, some or all of the functions associated with the message management server 272 may be integrated with the message server 268, or some other server in the host system 250. Furthermore, the host system 250 may comprise multiple message management servers 272, particularly in variant implementations where a large number of mobile devices need to be supported. Furthermore, in some embodiments, the functionality of the password policy module 278 may be provided by an IT policy module or an IT policy server (both not shown).

For maximum security, it is desirable for an IT administrator to be able to prevent certain passwords (i.e. forbidden passwords) from being chosen, as well as all corresponding "symbolically equivalent" passwords. A symbolically equivalent password that corresponds to a forbidden password has a majority of characters that the same as those in a forbidden password and at least one character or symbol that is symbolically equivalent to one or more letters (i.e. character sequences) of the given password. Symbolic equivalence includes characters that are visually or phonetically similar (i.e. looks or sounds the same) to other characters or character sequences. The IT administrator can specify this information in two lists; one list is a set of specified forbidden passwords that the user is not allowed to use, and the other list provides symbolic equivalents for a list of character sequences. In some embodiments, one or both of the list of symbolic equivalents and the list of specified forbidden passwords can be static. In some implementations, these lists can be realized locally or remotely using look-up tables in which the symbolic equivalent can be used as an index into the look-up table.

In some embodiments, the IT administrator can use the password policy module 278 to update the password policy by updating the list of specified forbidden passwords and the list of symbolic equivalents. In some embodiments, the IT administrator can also remotely update the password policy of the mobile devices by communicating with the password approval module 138 over the network 200 and updating a local copy of the list of specified forbidden passwords and the list of symbolic equivalents. The local copies of these lists can be stored on the flash memory 108 of the mobile device 100. Accordingly, the password policy can be maintained centrally and then communicated to various mobile devices 100 using a suitable wireless communication infrastructure such as that described herein. In some embodiments, the wireless communication infrastructure includes a transport stack that contains a set of communication protocols that enables the host system 250 to communicate with the mobile device 100. A subset of applications provided by the transport stack can be used to pass IT policy commands to the operating system of the mobile device 100 and can be used to provide an updated password policy. In some embodiments, the password policy update can also be done over a wired connection, such as via the cradle 264, for example.

At any time, the IT administrator can initiate a check of the passwords that are currently being used by the users of the mobile devices 100 associated with the host system 250. In some embodiments, this can be done each time the IT administrator distributes at least one of a new list of specified forbidden passwords and a list of symbolic equivalents. In some embodiments, the password approval method can be executed when the user is selecting a password for the first time or when the user changes the current password that is being used.

A password that corresponds to a specified forbidden password and contains zero or more symbolic equivalents, as defined by the symbolic list, is defined as being forbidden and is not approved by the password approval module 138. For example, if the specified forbidden password is "password", then the following exemplary proposed passwords are not allowed: "password", "password123", "pAssWord123", and "xpAsS1wOrDy". In the first case, the proposed password directly matches the specified forbidden password. In the second case, the proposed password can be considered to contain two portions; the first portion is "password" and the second portion is "123". The first portion directly matches the specified forbidden password. The third case is the same as the second case except that some of the characters have been capitalized. Accordingly, it is clear that password approval can be done on a case-insensitive basis. In the fourth case, the proposed password contains the specified forbidden password albeit not in a contiguous manner since the character "1" has been inserted between "pAsS" and "wOrD".

The list of symbolic equivalents can include symbols, or numbers that look or sound similar to a given character sequence or symbols that are commonly substituted for the given character sequence. A character sequence can include one or more characters as shown in Table 1. For example, for visual symbolic equivalents, the symbol "@" is similar to the character sequence "a" or "A", the number "5" is similar to the character sequence "s", the number "0" is similar to the character sequence "o", and the number "3" is similar to the character sequence "e". Further, for phonetic symbolic equivalents, some examples include replacing the character sequence "c" with "k", replacing the character sequence "k" with "c", replacing the character sequence "f" with "ph", or replacing the character sequence "ph" with "f". An exemplary list of symbolic equivalents is provided in Table 1. It should be noted that Table 1 is not meant to be an exhaustive or comprehensive list. Table 1 is provided by way of example only, and those skilled in the art will recognize that additional symbolic equivalents can be defined in a similar manner.

A given entry in the list of symbolic equivalents includes a character sequence having one or more characters and a corresponding list of symbolic equivalents. For example, Table 1 specifies that "|)" is a symbolic equivalent for the character sequence "D" and that "0r" is a symbolic equivalent for the character sequences "er" or "or". Based on the symbolic equivalents in Table 1, passwords that are similar to "password" include but are not limited to: "p@ssword", "p@55w0rd", "ppa55wordd" and "|o4ZZVV0|)\|)". It should be noted that spaces are used in some of the symbolic equivalents in Table 1 to make it easier to see the characters that make up a symbolic equivalent. In use, the symbolic equivalents may or may not include spaces. If the symbolic equivalents are stored without spaces, then if a user enters a password that includes spaces, the spaces can then be removed for purposes of symbolic comparison with specified forbidden passwords. Alternatively, if there are spaces in the symbolic equivalents then these spaces can be removed, as well as spaces in the user-entered password so that the user-entered password can be compared with the symbolic equivalents.

TABLE 1

Exemplary List of Symbolic Equivalents

| Character Sequence | Symbolic Equivalent |
|---|---|
| A | @, 4, ´, /\ |
| B | 8, \|3 |
| C | (, <, \|<, s, $, 5 |
| D | \|) |
| E | 3 |
| F | p h, \|[, \|= |
| G | 6, 9 |
| H | \|-\|, (-), \|{ |
| I | 1, !, \| |
| K | <, \|<, \|{, ( |
| L | 1, !, \|, \|__ |
| M | /\/\, r n, \|v\|, /v\, \|V\| |
| N | /\/, \|\\| |
| O | 0, ( ) |
| P | \|0, \|o |
| Q | "0," "o," (note use of comma in symbolic equivalent) |
| R | \|p, \|)\\ |
| S | 5, Z, $, (, x, ><, < |
| T | 7, + |
| U | \|_\|, ( ) |
| V | \\/ |
| W | \\/\\/, \\\\', vv, \|/\\|, '//, `// |
| X | ><, xx, cks |
| Y | '/, `/, \\' |
| Z | 2, s, $, 5 |
| or | 0r |
| Er | 0r |

Figure 5:
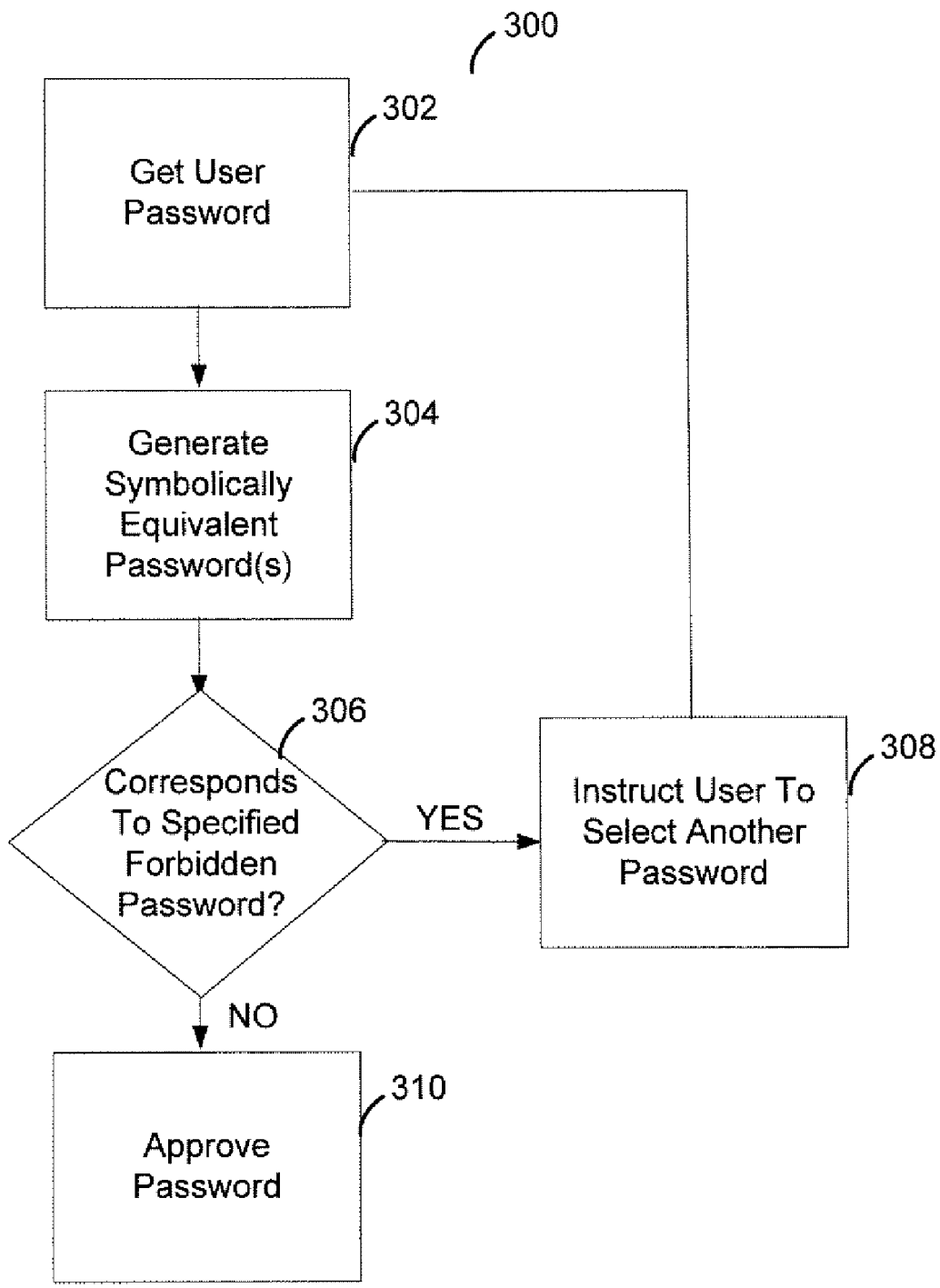

Referring now to FIG. 5, shown therein is a flowchart diagram of an exemplary embodiment of a password approval method 300. The password approval method 300 can be executed by the password approval module 138 at various times, including when the user enters a password for the first time, when the user changes a password, when the IT administrator distributes a new symbolic equivalents list or a new list of specified forbidden passwords, or at any time the IT administrator chooses to do a random check of passwords that are currently being used on the mobile devices 100.

At step 302, the user password is obtained. The term user password is meant to include the current password that the user is currently using, or a proposed password that the user wishes to use. At step 304, at least one symbolically equivalent password is generated. A symbolically equivalent password is a symbolic translation of the user password in which any symbolic equivalents in the user password are identified and the corresponding character sequence as defined in the list of symbolic equivalents is obtained. This step can include creating a temporary buffer to hold the symbolic translation of the user password. The symbolic translation can be performed as follows. For each character in the user password, the character is first added to the symbolically equivalent password being generated in the temporary buffer. If the character is defined as a symbolic equivalent (for example see the equivalents defined in Table 1), then the corresponding character sequence is appended to the symbolic password. Further, if the current character and one or more subsequent characters in the user password are defined as a multi-character symbolic equivalent, then the corresponding character sequence is also appended to the symbolic password. Examples of multi-character symbolic equivalents from Table 1 include "xx", "cks", and the like. This can be done recursively. For instance, the first character can be processed, then the first and second characters together, then the first, second and third characters and so on and so forth. Once the combinations including the first character are processed, then the combinations beginning with the second character can be processed, and so on and so forth.

For example, for the user password "ssl", one of the symbolically equivalent passwords that is created can be "sczsczlil". Further, for the user password "l3", one of the generated symbolically equivalent passwords can be "lilb3e". In this case, character "l" is copied into the temporary buffer, then character sequences for which the character "l" is symbolically equivalent are copied into the temporary buffer, then sequences for which the character sequence "l3" is symbolically equivalent are copied into the temporary buffer. Then the character "3" gets copied into the temporary buffer and, then character sequences for which the character "3" is symbolically equivalent are copied into the temporary buffer to create the symbolically equivalent password.

There can be some instances in which the symbolic equivalent maps to two or more character sequences. In this case, in some embodiments, all of the character sequences to which the symbolic equivalent is mapped can be appended to the symbolic password. Alternatively, in some embodiments, additional symbolically equivalent passwords can be generated to cover these different possibilities. For instance, if a symbolic equivalent is found in the user password that maps to three different character sequences, then two additional symbolically equivalent passwords can be generated. This processing is then continued for each of the additional symbolically equivalent passwords which may result in the generation of additional symbolically equivalent passwords if any of the remaining the characters are symbolic equivalents that map to two or more character sequences.

At step 306, the one or more symbolically equivalent passwords are compared to each specified forbidden password provided in the list of specified forbidden passwords. For a given specified forbidden password, in general, if the characters in the given specified forbidden password appear in order, although not sequentially or contiguously, in the symbolically equivalent password (or in some embodiments, in at least one of the symbolically equivalent passwords) then the user password is not approved. Otherwise, the user password is approved. This comparison can be done on a case-insensitive basis. In some embodiments, the user password is not approved if the majority of the characters in the given specified forbidden password appear in order, although not sequentially or contiguously, with a minority of the characters reversed in order.

If the user password is not approved, then the method 300 moves to step 308. The user is notified that the user password has not been approved and is asked to select another password. The method 300 then moves back to step 302. Step 308 may also include providing the user with an explanation of why the user password is not approved so that the user can make a more intelligent selection for the user password.

If the user password is approved, then the method 300 moves to step 310. An indication of password approval can be provided to the user of the mobile device 100. At this point, the user is then free to continue using the mobile device 100.

As an example, assume that the user password is "p@s5word". Further, assume that the character sequence "a" corresponds to the symbolic equivalent "@" and the character sequence "s" corresponds to the symbolic equivalent "5" as illustrated in Table 1. After step 304, one of the generated symbolic passwords is "p@as5sword". If the list of specified forbidden passwords contains "password", then in step 306 the user password is rejected, since the symbolically equivalent password contains the characters "p", "a", "s", "s", "w", "o", "r", and "d" in order (although not contiguously or sequentially).

In some embodiments, for more stringent control of password use, step 306 of the method 300 does not have to require that all of the characters of a specified forbidden password appear sequentially in the symbolically equivalent password. For instance, using the previous example, the proposed password can be "@ps5word". Assuming the same character sequence correspondence with the symbolic equivalents, one of the generated symbolically equivalent passwords is "@aps5sword". Such a password can also not be approved since all of the characters in the specified forbidden password appear in the symbolically equivalent password although not in order (the "a" and the "p" are reversed). In these embodiments, an order parameter can be specified which dictates the proportion of the characters in the symbolically equivalent password that are in the correct order compared to a specified forbidden password. In the example just given, the proportion is 75% (i.e. 6 out of 8 characters of the user's proposed password are in the correct order compared to the specified forbidden password).

Further, in some embodiments, for more stringent control of password use, step 306 of the method 300 does not have to require that all of the characters of a specified forbidden password appear in the symbolically equivalent password. For instance, using the previous example, the proposed password can be "p@s5wor". Assuming the same character sequence correspondence with the symbolic equivalents, one of the generated symbolically equivalent passwords is "p@as5swor". Such a password can also not be approved since most of the characters in the specified forbidden password appear in the symbolically equivalent password. There can be a minimum limit on the number of characters of the specified forbidden password that must appear in the symbolic password, which can be specified by a length parameter. For instance, using the specified forbidden password "password", the IT administrator may specify that at least six of these characters must appear in the symbolically equivalent password for the user password to be rejected. This length parameter for the number of matching characters can be specified for a given password in the list of specified forbidden passwords, or for all of the passwords in the list of specified forbidden passwords. In some embodiments, the length parameter can be specified for each password in the list of specified forbidden passwords. In some embodiments, the length parameter can also be specified as a percentage. In the example just given, the length parameter is 87.5% (i.e. 7 out of 8 characters of the specified forbidden password are in the user's proposed password).

In some embodiments, for even more stringent control of password use, step 306 of the method 300 does not have to require that all of the characters of a specified forbidden password appear in the symbolically equivalent password or that these characters appear sequentially. For instance, using the previous example, the proposed password can be "@ps5wor". Assuming the same character sequence substitutions, one of the generated symbolically equivalent passwords is "@aps5swor". Such a password can also not be approved since most of the characters in the specified forbidden password appear in the symbolically equivalent password even though some of the characters are not in the correct order. In these embodiments, both the order and length passwords can be specified.

Accordingly, the password approval method 300 described herein does not allow a user password that correspond to a specified forbidden password that can be defined by the IT administrator. While the password approval method 300 may seem to be dictionary-like, it also takes into consideration additional human behavior (i.e. the use of symbols).

In one aspect, at least one embodiment described herein provides a computer program product for approving a user password for a communication device, the computer program product comprising a computer readable medium embodying program code means executable by a processor of the communication device for implementing a password approval method. The password approval method comprises:
obtaining the user password;
generating at least one symbolically equivalent password;
comparing the at least one symbolically equivalent password with at least one specified forbidden password; and,
disapproving the user password if the at least one symbolically equivalent password corresponds to the at least one forbidden password, otherwise approving the user password.

In some cases, for at least one given character of the user password, the password approval method includes generating the at least one symbolically equivalent password by appending the at least one given character of the user password to the symbolically equivalent password, determining if the at least one given character of the user password is a symbolic equivalent and if so determining a corresponding character sequence and appending the corresponding character sequence to the at least one symbolically equivalent password.

In some cases, the character sequence includes one or more characters.

In some cases, the at least one given character of the user password includes adjacent characters in the user password.

In some cases, the password approval method further includes comparing the at least one given character of the user password to a list of symbolic equivalents to determine if the at least one given character of the user password is a symbolic equivalent.

In some cases, the list of symbolic equivalents includes visual symbolic equivalents.

In some cases, the list of symbolic equivalents includes phonetic symbolic equivalents.

In some cases, in the comparing step of the password approval method, the at least one symbolically equivalent password corresponds to the at least one forbidden password if the number of characters in the at least one forbidden password that are included in the at least one symbolically equivalent password is greater than or equal to a value specified by a length parameter.

In some cases, in the comparing step of the password approval method, the at least one symbolically equivalent password corresponds to the at least one forbidden password if the number of characters in the at least one forbidden password that are included in the correct order in the at least one symbolically equivalent password is greater than or equal to a value specified by an order parameter.

In another aspect, at least one embodiment described herein provides a method for approving a user password for a communication device. The password approval method comprises:
obtaining the user password;
generating at least one symbolically equivalent password;
comparing the at least one symbolically equivalent password with at least one specified forbidden password; and,
disapproving the user password if the at least one symbolically equivalent password corresponds to the at least one forbidden password, otherwise approving the user password.

In some cases, for at least one given character of the user password, the method includes generating the at least one symbolically equivalent password by appending the at least one given character of the user password to the symbolically equivalent password, determining if the at least one given character of the user password is a symbolic equivalent and if so determining a corresponding character sequence and appending the corresponding character sequence to the at least one symbolically equivalent password.

In some cases, the method further includes comparing the at least one given character of the user password to a list of symbolic equivalents to determine if the at least one given character of the user password is a symbolic equivalent.

In some cases, the list of symbolic equivalents includes at least one of: visual symbolic equivalents, phonetic symbolic equivalents, and symbols that are commonly substituted for a given character sequence.

In some cases, in the comparing step, the at least one symbolically equivalent password corresponds to the at least one forbidden password if at least one of: the number of characters in the at least one forbidden password that are included in the at least one symbolically equivalent password is greater than or equal to a value specified by a length parameter, and the number of characters in the at least one forbidden password that are included in the at least one symbolically equivalent password in the correct order is greater than or equal to an order parameter.

In another aspect, at least one embodiment described herein provides a communications device comprising: a main processor that controls the operation of the communications device; a communication subsystem connected to the main processor, the communication subsystem sends and receives data; and, a password approval module executable by the main processor for approving a user password for the communication device by: obtaining the user password; generating at least one symbolically equivalent password; comparing the at least one symbolically equivalent password with at least one specified forbidden password; and, disapproving the user password if the at least one symbolically equivalent password corresponds to the at least one forbidden password, otherwise approving the user password.

In some cases, for at least one given character of the user password, the password approval module generates the at least one symbolically equivalent password by appending the at least one given character of the user password to the symbolically equivalent password, determining if the at least one given character of the user password is a symbolic equivalent and if so determining a corresponding character sequence and appending the corresponding character sequence to the at least one symbolically equivalent password.

In some cases, the password approval module compares the at least one given character of the user password to a list of symbolic equivalents to determine if the at least one given character of the user password is a symbolic equivalent.

In some cases, the list of symbolic equivalents includes at least one of: visual symbolic equivalents, phonetic symbolic equivalents, and symbols that are commonly substituted for a given character sequence.

In some cases, the password approval module determines that the at least one symbolically equivalent password corresponds to the at least one forbidden password if at least one of: the number of characters in the at least one forbidden password that are included in the at least one symbolically equivalent password is greater than or equal to a value specified by a length parameter, and the number of characters in the at least one forbidden password that are included in the at least one symbolically equivalent password in the correct order is greater than or equal to an order parameter.

It should be understood that various modifications can be made to the embodiments described and illustrated herein, without departing from the embodiments, the general scope of which is defined in the appended claims. It should also be understood that while the embodiments were described for a mobile device, the embodiments are generally applicable to any communication or computing device that requires the use of password approval. For instance, the embodiments may be modified for implementation on a computer in which the communication subsystem may instead be a network connection or a modem.

The invention claimed is:

1. A device comprising:
    a processor, and at least one physical memory component;
    wherein the processor is configured to:
        receive a password to approve, the password to approve comprising a character sequence;
        execute a password approval method, wherein the processor is configured to:
            for each selected character of at least one character in the character sequence:
                add the selected character from the character sequence to each of one or more symbolically equivalent passwords; and
                for each character sequence equivalent associated with the selected character found in the list of symbolic equivalents, add the character sequence equivalent to at least one of the one or more symbolically equivalent passwords, wherein the character sequence equivalent is associated with the selected character if a corresponding symbolic equivalent in the list consists of the selected character alone or the selected character plus one or more subsequent characters in the character sequence;
            compare each of the one or more symbolically equivalent passwords with a specified forbidden password; and
            disapprove the password to approve if any one of the one or more symbolically equivalent passwords corresponds to the specified forbidden password.

2. The device of claim 1, wherein the device comprises a mobile device.

3. The device of claim 1, wherein the list of symbolic equivalents is stored in the memory of the device.

4. The device of claim 1, wherein the list of symbolic equivalents comprises visual symbolic equivalents.

5. The device of claim 1, wherein the list of symbolic equivalents comprises phonetic symbolic equivalents.

6. The device of claim 1, wherein a given symbolically equivalent password corresponds to the specified forbidden password if all of the characters in the specified forbidden password are in the given symbolically equivalent password.

7. The device of claim 1, wherein a given symbolically equivalent password corresponds to the specified forbidden password if a number of characters in the specified forbidden password that are in the given symbolically equivalent password is greater than or equal to a value specified by a length parameter.

8. The device of claim 1, wherein a given symbolically equivalent password corresponds to the specified forbidden password if all of the characters in the specified forbidden password are, in order, in the given symbolically equivalent password.

9. The device of claim 1, wherein a given symbolically equivalent password corresponds to the specified forbidden password if a number of characters in the specified forbidden password that are, in order, in the given symbolically equivalent password is greater than or equal to a value specified by an order parameter.

10. The device of claim 1, wherein when executing the password approval method, the processor is further configured to:
    for each additional forbidden password in a list of forbidden passwords that is different from the specified forbidden password, compare each of the one or more symbolically equivalent passwords with the additional forbidden password;
    disapprove the password to approve if any one of the one or more symbolically equivalent passwords corresponds to any one of the forbidden passwords in the list of forbidden passwords; and
    approve the password to approve if none of the one or more symbolically equivalent passwords correspond to at least one of the forbidden passwords in the list of forbidden passwords.

11. The device of claim 10, wherein the list of forbidden passwords is stored in the memory of the device.

12. The device of claim 10, wherein the processor is further configured to receive an updated list of forbidden passwords at the device.

13. The device of claim 12, wherein the processor is configured to execute the password approval method in response to the updated list of forbidden passwords being received at the device.

14. The device of claim 1, wherein the processor is further configured to receive an updated list of symbolic equivalents at the device.

15. The device of claim 14, wherein the processor is configured to execute the password approval method in response to the updated list of symbolic equivalents being received at the device.

16. The device of claim 1, wherein the processor is configured to execute the password approval method in response to the password to approve being received at the device for a first time.

17. The device of claim 1, wherein the processor is configured to execute the password approval method in response to a user request to change a password being received at the device.

18. The device of claim 1, wherein the processor is configured to execute the password approval method in response to a request, initiated by an IT administrator, for a random check of the password to approve.

19. A password approval method, comprising:
    a processor receiving a password to approve, the password to approve comprising a character sequence;
    for each selected character of at least one character in the character sequence:
        the processor adding the selected character from the character sequence to each of one or more symbolically equivalent passwords; and
        for each character sequence equivalent associated with the selected character found in the list of symbolic equivalents, the processor adding the character sequence equivalent to at least one of the one or more symbolically equivalent passwords, wherein the character sequence equivalent is associated with the selected character if a corresponding symbolic equivalent in the list consists of the selected character alone or the selected character plus one or more subsequent characters in the character sequence;

the processor comparing each of the one or more symbolically equivalent passwords with a specified forbidden password; and the processor disapproving the password to approve if any one of the one or more symbolically equivalent passwords corresponds to the specified forbidden password.

20. A non-transitory computer-readable medium comprising instructions executable by a processor, wherein the processor is configured to execute a password approval method, and wherein the password approval method comprises:

receiving a password to approve, the password to approve comprising a character sequence;

for each selected character of at least one character in the character sequence:

adding the selected character from the character sequence to each of one or more symbolically equivalent passwords; and for each character sequence equivalent associated with the selected character found in the list of symbolic equivalents, adding the character sequence equivalent to at least one of the one or more symbolically equivalent passwords, wherein the character sequence equivalent is associated with the selected character if a corresponding symbolic equivalent in the list consists of the selected character alone or the selected character plus one or more subsequent characters in the character sequence;

comparing each of the one or more symbolically equivalent passwords with a specified forbidden password; and disapproving the password to approve if any one of the one or more symbolically equivalent passwords corresponds to the specified forbidden password.

\* \* \* \* \*